UNITED STATES PATENT OFFICE.

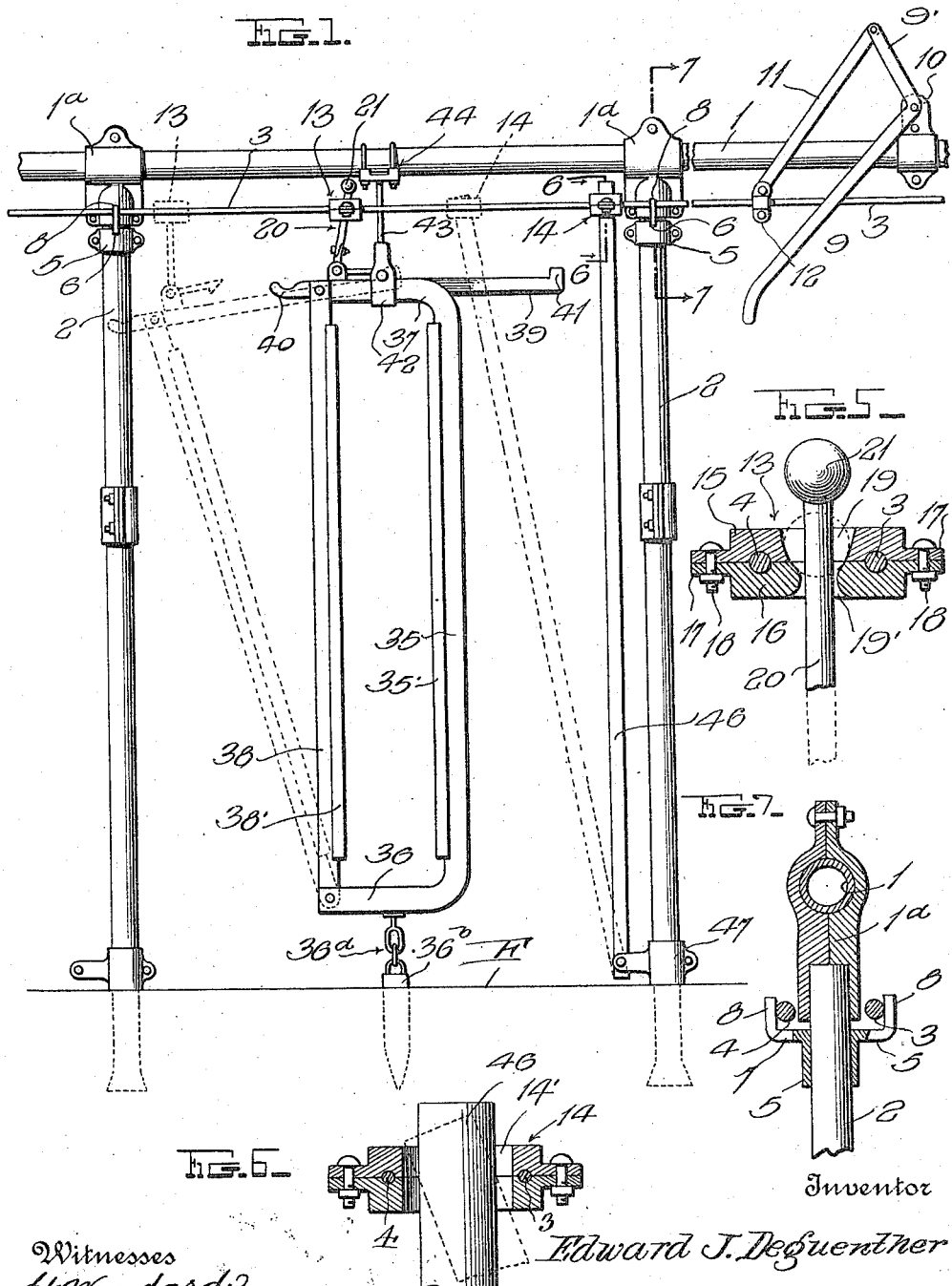

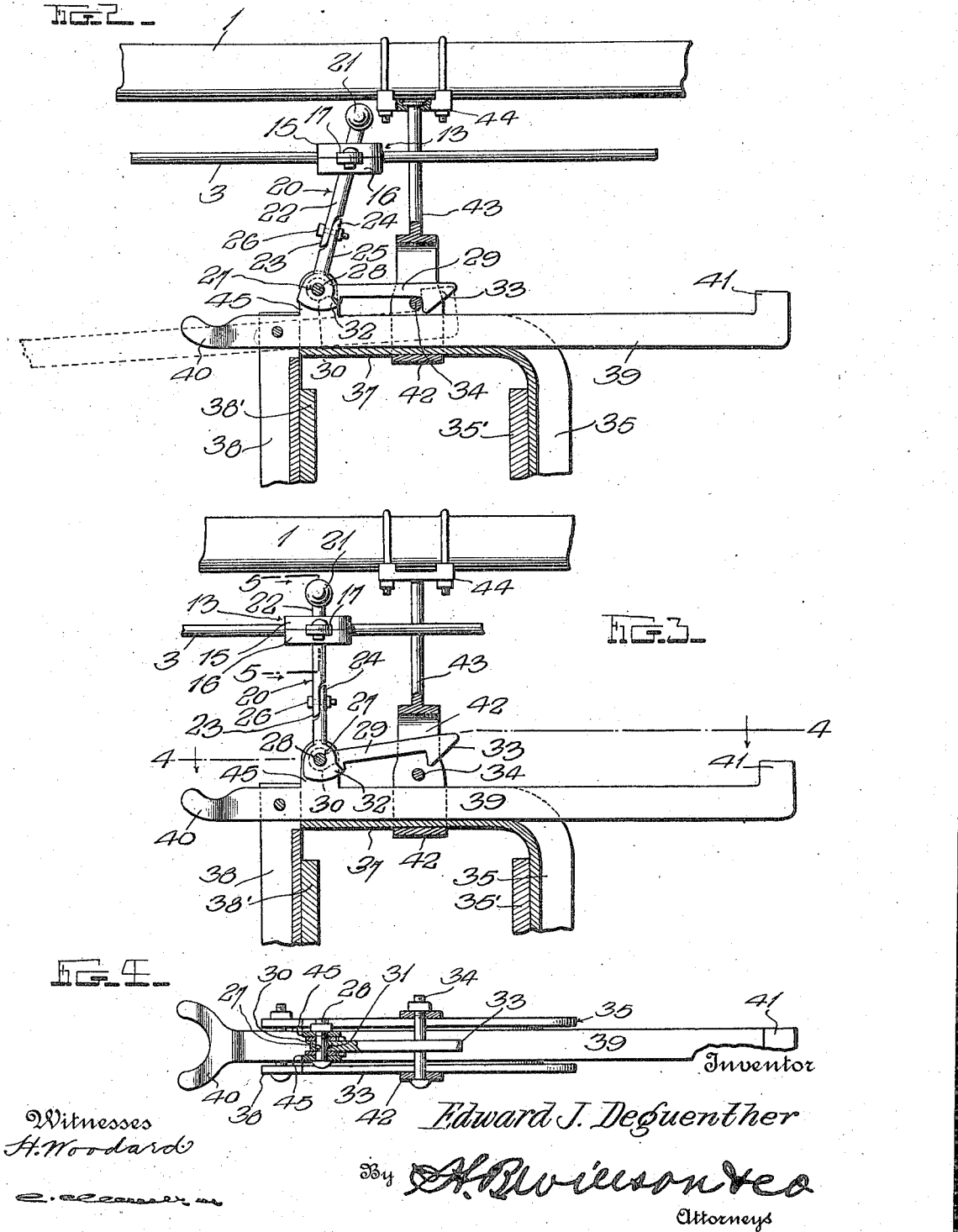

EDWARD JAMES DEGUENTHER, OF MILWAUKEE, WISCONSIN.

STANCHION.

1,184,833.     Specification of Letters Patent.      Patented May 30, 1916.

Application filed November 1, 1915. Serial No. 59,114.

*To all whom it may concern:*

Be it known that I, EDWARD J. DEGUENTHER, a citizen of the United States, residing at Milwaukee, in the county of Milwaukee and State of Wisconsin, have invented certain new and useful Improvements in Stanchions; and I do declare the following to be a full, clear, and exact description of the invention, such as will enable others skilled in the art to which it appertains to make and use the same.

This invention relates to cattle stanchions and more particularly to the means for operating the stanchions to open and close them.

The main object of the invention is to provide novel means for controlling the movement of a pivoted shackle which constitutes a part of the stanchion.

Another object is to provide improved means for simultaneously operating a plurality of stanchions whereby all the cattle may be released or secured by a single operation.

Another object is to provide improved means for individually releasing the stanchion shackle so that a single animal may be released or confined at pleasure.

With the above and other objects in view, the invention consists of the novel features of construction, combination and arrangement of parts to be hereinafter more fully described and claimed.

In the accompanying drawings: Figure 1 represents a front elevation of a cattle stanchion mounted in operative position and shown closed in full lines and open in dotted lines; Fig. 2 is an enlarged detail side elevation partly in section showing the connecting and actuating means of the shackle bar with the latch in closed position in full lines and with the bar connected with the shackle bar in open position in dotted lines; Fig. 3 is a similar view showing the latch in the act of being opened; Fig. 4 is a horizontal section taken on the line 4—4 of Fig. 3; Fig. 5 is an enlarged detail sectional view through the clamp which connects the latch lifting rod with the actuating rod, taken on the line 5—5 of Fig. 3; Fig. 6 is an enlarged detail vertical section taken on the line 6—6 of Fig. 1; and Fig. 7 is a similar view taken on the line 7—7 of Fig. 1.

In the embodiment illustrated, a stanchion support 1 is shown in the form of a rod or beam mounted on suitable posts 2 which are spaced laterally apart a sufficient distance to provide what may be termed stalls for the cattle, the space between two of said posts being designed to accommodate the animal to be confined.

The posts 2 may be mounted in any suitable manner and project upwardly from the floor F of the cow barn or stable, and in addition to supporting the stanchion suspension rod or bar 1, form supports for stanchion operating rods 3 and 4 which are here shown arranged parallel with each other on opposite sides of the post 2 in a plane below the rod 1 and are held in fixed relation by means hereinafter described. These actuating rods 3 and 4 are shown supported on brackets 5 which are clamped to the post 2 below the rod supporting clamps 1ª which latter are in the form of ordinary couplings. The brackets 5 have arms 6 and 7 extending laterally on opposite sides of the post 2, and said arms have upwardly extending terminals 8, so that the rods 3 and 4 may rest thereon and yet slide longitudinally on said arms without restriction.

An operating lever for the rods 3 and 4 is here shown in the form of a bell crank 9 fulcrumed on a bracket 10 which is clamped to the rod or bar 1 at any suitable or desired point convenient for manipulation by a barn attendant. A link 11 is pivotally connected at one end to the upwardly extending arm 9′ of the lever 9 and at its other end to a bracket 12 which is clamped to the rod 3 so that when said lever 9 is moved toward the right as shown in Fig. 1, the link 11 will be swung to the left, thereby moving the rods 3 and 4 longitudinally toward the left for a purpose to be described. These rods 3 and 4 are clamped together and are adapted to be moved simultaneously in either direction according to the direction in which the lever 9 is moved, the means for connecting said rods being shown in the form of clamps 13 and 14 which in addition to connecting the rods, serve as means for connecting the shackle bar latch to be described, to the rods, and the stop bar to said rods, as will be hereinafter described.

The clamp 13 which connects the rods together and the shackle bar latch to said rods, is here shown in the form of two opposed clamping members 15 and 16 having registering sockets in their inner faces positioned to receive and clamp the rods 3 and 4 between them. These clamping jaws or members 15 and 16 may be secured in locked or operative position by any suitable means, said jaws being here shown provided with laterally extending apertured lugs 17 which are connected in clamping engagement by bolts 18. These jaws 15 and 16 are provided intermediately of their ends between the rod receiving sockets therein, with registering openings 19 and 19' through which a headed rod 20 is designed to pass, the head 21 thereof being of a size sufficient to prevent the rod from dropping through the opening 19' in the lower member 16. The opening 19 is of a size sufficient to permit the passage of the head 21 of rod 20 which is seated in opening 19' and held against passing therethrough (see Fig. 5).

The rod 20 as shown is made in two sections, the upper section 22 thereof carrying the head 21 and having a longitudinally extending tongue 23 at its inner end which is designed to overlap a longitudinally extending tongue 24 formed on the inner end of the lower section 25. These tongues 23 and 24 are provided with registering apertures through which a thumb screw or bolt 26 is designed to pass for securing the sections in adjusted position, whereby they are held rigidly against relative movement in one direction and permitted to pivot in a plane at right angles thereto so that the sections of the rod 20 will be held rigid for the purpose of opening and closing a latch to be described, and permitted to pivot or bend at their point of connection, to provide for the lateral movement of the stanchion to allow the animal to turn its head. This screw or bolt may be loosened to permit separation of the sections relatively to each other for a purpose to be hereinafter described.

The lower section 25 is slotted edgewise at its lower end and the opposed walls thereof are provided with registering apertures as 27 for the passage of a connecting pivot 28 which connects said member 20 with the shackle bar of the stanchion as will be hereinafter described, and with the locking latch thereof.

A latch bar 29 has one end thereof disposed in the slot of the member 25 and as shown has a head 30 at its inner end provided with a central aperture 31 which when the head 30 is disposed in the slot of the member 25 registers with the aperture 27 therein to receive the connecting pivot 28. A shoulder 32 is shown formed on the lower edge of the latch bar 29 adjacent the head 30 thereof and is designed for a purpose to be described. A bill or hook 33 formed at the free end of the latch bar 29 is designed to engage a pivot 34 on the upper end of the stanchion for locking the shackle bar of the stanchion in closed position as will be hereinafter described.

The stanchion proper comprises a body consisting of a side bar 35 having laterally extending arms 36 and 37 at its lower and upper ends respectively which form the bottom and top members of the stanchion, said arms being preferably made integral with the side member 35, though not necessarily. These members of the stanchion are preferably constructed of angle bars U-shaped in cross section, and a wooden lining 35' is shown secured to the inner face of the side bar 35 to protect the neck of the animal to be confined by the stanchion. Pivotally connected to the free end of the lower bar 36 of the stanchion is a shackle bar 38 which is of the same length as the side bar 35 and is also preferably constructed of angle iron U-shaped in cross section, being provided on its inner face with a wooden lining 38' which is disposed in opposed relation to the lining bar 35' when the stanchion is in operative position, so that these lining bars 35' and 38' engage opposite sides of the animal's neck in the usual manner. An arm 39 extends laterally inward from the free end of the shackle bar 38 in a plane substantially at right angles and is pivoted at one end to said bar and is slidably mounted in the groove of the upper stanchion member 37 formed by the U-shaped angle bar from which it is constructed, the flanges of said member forming guides for said arm 39. This arm 39 has a bifurcated extension 40 at its outer end which projects laterally beyond the shackle bar 38 and is designed to straddle one of the posts 2 when the shackle bar is opened for limiting the opening thereof and for holding the stanchion against lateral movement, as is shown clearly in the dotted line position shown in Fig. 1, the shackle bar serving when open to close or obstruct the space at the left of the stanchion to cause the cow to put her head in the stanchion instead of in the space at the left thereof. The arm 39 is provided at its free end with an upturned nose 41 which is designed to engage the pivot 34 for limiting the opening movement of the shackle bar.

The stanchion proper is suspended from the rod or bar 1 by any suitable means, a clamp 42 being here shown engaged with the upper member 37 thereof and having the pivot 34 extending transversely therethrough with which the bill 33 of the latch 29 is designed to coöperate for holding the shackle bar in locked or closed position. A rod 43 connected with the clamp 42 is swiveled to an attaching element 44 here shown in the form of a hanger engaged with the rod 1 and which may be adjusted at any desired point on said rod to position the stanchion at the desired place within the stall. The lower bar 36 is flexibly connected to the floor F of the stall by any suitable means, a chain 36ª being here shown connected with said bar 36 and with an anchor 36ᵇ secured to the floor.

The arm 39 of the shackle bar is provided at its inner end on its upper edge with a pair of upstanding apertured lugs 45 between which the rod 20 carrying the latch 29 is pivotally mounted by means of the pivot 28 which passes through the apertures in said lugs 45, through the apertures 27 in the walls of the lower section 25 of the rod 20 and through the aperture 31 in the head 30 of the latch bar 29, whereby said latch bar 29 is mounted to pivot vertically to adapt the bill 33 thereof to be engaged and disengaged with the pivot 34 on the clamp 42 for locking or unlocking the shackle bar 38 to secure or release the animal for which the stanchion is designed, and which is accomplished by operating the lever 9 in a manner hereinafter to be described.

A guard, or what is termed in the trade, a "sure stop" is here shown in the form of an upright rod or bar 46 which is pivoted at one end to a bracket 47 extending laterally from the lower end of one of the posts 2. The upper end of this bar 46 is loosely engaged with the clamp 14 which connects the rods 3 and 4, and said clamp is similarly constructed to the clamp 13, being provided intermediate of its ends at a point between its point of engagement with the rods 3 and 4 with an opening 14' through which the rod 46 extends and is loosely engaged, whereby said rod 46 is moved with the rods 3 and 4 during the reciprocation thereof for opening or closing the shackle bars of the stanchion, and is designed when moved forward into the dotted line position shown in Fig. 1 to obstruct the space between the stanchion and the post 2 at the right thereof to prevent the cow from inserting her head in this space instead of in the stanchion.

In the operation of these improved stanchions, any desired number of which may be connected with the rods 3 and 4 which extend the full length of the barn or stable, the parts of each being in the full line position shown in Fig. 1, which is the position assumed when an animal is secured, when it is desired to open the stanchions to release the animals whose heads are engaged thereby, the lever 9 is moved toward the right, thereby causing the link 11 to move toward the left, carrying with it the bars 3 and 4 which slide on their supporting brackets 6 and 7 carrying with them the clamps 13 and 14 of the shackle bars and sure stops. This movement of each clamp 13 carries with it the depending rod 20 which is connected with a shackle bar arm 39 and normally is inclined slightly toward the right as shown in full lines in Fig. 1. The movement of the clamp 13 toward the left causes the rod 20 when it assumes a perpendicular position, to rise in the clamp with which it is loosely engaged and the shoulder 32 of the latch bar to engage the wall of the slot in said bar section 25 thereby, lifting the bill of the latch bar and disengaging it from the pivot 34. The continued movement of the clamp 13 to the left causes the shackle bar 38 to be swung outwardly until it assumes the position shown in dotted lines in Fig. 1 with the furcations of the arm extension 40 engaging opposite sides of the adjacent post 2 and the nose 41 engaging pivot 34. The downward pull exerted by this outward movement of the shackle bar causes the rod 20 to be drawn down until its head 21 engages the seat in the lower member of the clamp 13, said rod being sufficiently long to provide for this. The animal may then withdraw its head from the stanchion. It will of course be understood that this movement of the rods 3 and 4 to the left also carries the clamp 14 and the sure stop bar 46 with them and positions it diagonally across the space between the stanchion and the adjacent post at the right, and the parts are allowed to remain in this position until the cows are again to be secured, so that when driven to their respective stalls, their heads will be directed into the stanchion instead of at one side thereof. After the heads of the animals are inserted between the bars 35 and 38 of the stanchion, a movement of the lever 9 to the left will shift the rods 3 and 4 to the right and simultaneously close all the stanchions by moving their shackle bars 38 inward until the bills 33 of the latches engage the pivots 34. This movement of the rods 3 and 4 for closing the shackle bars also moves the "sure stop" or guards 46 to the right into position adjacent their posts 2 on which they are pivoted (see full line position of Fig. 1).

When it is desired to release an individual animal the set screw 26 is removed and the latch of the stanchion manually released to permit the opening of the shackle bar.

I claim as my invention:

1. The combination with a horizontally disposed stanchion suspension bar; of a stanchion suspended therefrom and having a pivoted shackle bar, a longitudinally movable actuating rod arranged parallel with said suspension bar, a member fixed to said rod and having an opening extending vertically therethrough and flared at its upper end, a headed latch release bar mounted to slide in said opening, and having its lower end slotted edgewise, a latch bar having an apertured head disposed in the slotted end of said release bar and provided with a shoulder adjacent said head positioned for engagement with the lower wall of said slot when said release bar is moved laterally in one direction for lifting said latch bar, and means for shifting said actuating rod.

2. In a cattle stanchion, the combination of a body, a pivoted shackle coöperating therewith, a latch fulcrumed on said shackle and coöperating with said body to hold the shackle closed, a releasing member pivoted to said latch and composed of two sections having longitudinally extending overlapping tongues at their inner ends, means for connecting said tongues to hold them rigidly together against relative movement in one direction and to permit them to pivot in a direction at right angles to said first mentioned direction, coöperating means on said releasing member and latch for lifting the latch on the movement of said member in one direction, and means for actuating said releasing member.

3. The combination with a plurality of longitudinally spaced posts, a stanchion suspension bar mounted thereon, brackets carried by said posts on opposite sides thereof, rods slidably supported by said brackets in laterally spaced relation, clamps connecting said rods, and each having an aperture therein between said rods, stanchions suspended from said bar between said posts, and each having a pivoted shackle bar with a latch fulcrumed thereon, a latch releasing bar pivoted to the latch and mounted to slide in the aperture in one of said clamps, coöperating means on said latch releasing bar for lifting the latch on the movement of said bar in one direction, and means for reciprocating said rods to simultaneously actuate said latch releasing means.

In testimony whereof I have hereunto set my hand in presence of two subscribing witnesses.

EDWARD JAMES DEGUENTHER.

Witnesses:
GEORGE A. BURNS,
MARIE B. CALLAN.

Copies of this patent may be obtained for five cents each, by addressing the "Commissioner of Patents, Washington, D. C."